Jan. 13, 1970  E. K. CLARDY ET AL  3,489,523
COMBUSTIBLE GAS DETECTION IN CONTAINERS
Filed Jan. 12, 1967  2 Sheets-Sheet 1

INVENTOR.
E. K. CLARDY
ALFONS MESSINGER
BY
Young & Quigg
ATTORNEYS

United States Patent Office 3,489,523
Patented Jan. 13, 1970

3,489,523
COMBUSTIBLE GAS DETECTION IN CONTAINERS
Edwin K. Clardy and Alfons Messinger, Bartlesville, Okla., assignors to Phillips Petroleum Company, a corporation of Delaware
Filed Jan. 12, 1967, Ser. No. 608,792
Int. Cl. G01n 27/62, 33/22
U.S. Cl. 23—232                                     2 Claims

ABSTRACT OF THE DISCLOSURE

A hydrogen flame detector adapted to test polymerized hydrocarbon bottles for the presence of odorous combustible gases as the bottles move on a conveyor belt.

---

Figure 1:
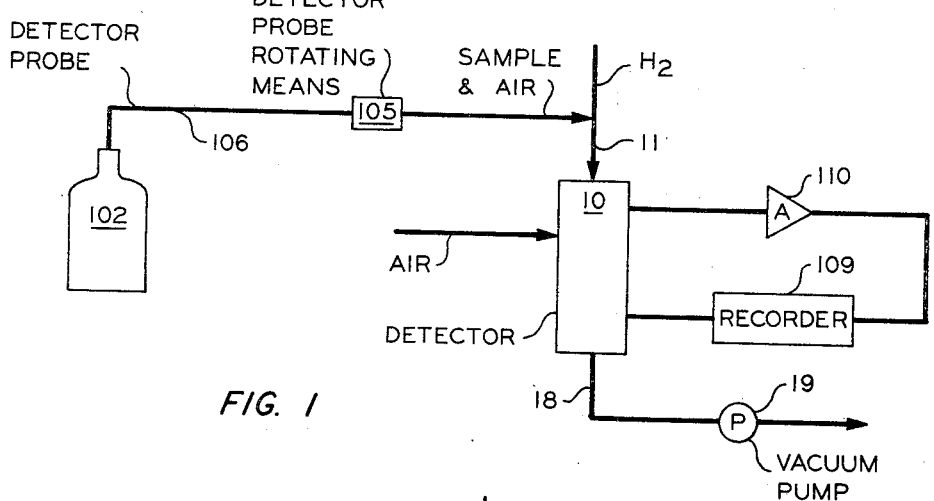

This invention relates to apparatus for the analysis of fluid streams which contain combustible components. In another aspect it relates to a method of testing containers for the presence of combustible components.

Detection of gaseous materials finds application in a wide variety of processes. One such example is in the detection of combustible gases in polymerized hydrocarbon containers. Both the sanitary standards and marketing capacity of containers manufactured from plastics are impaired if odors are present. Prior art fails to teach a method for the detection of odors resulting from combustible gases in polymerized hydrocarbon containers, because the prior art reflects a time when containers for packaging humanly consumed products were constructed primarily of glass or paper. The instant invention solves this problem of detecting odors resulting from combustible gases in containers constructed of polymerized hydrocarbon.

Prior art reveals apparatus for the detection of gases; however, the prior art apparatus provides no way to cope with and remedy, first, the problems of extraneous matter collecting in the chamber of the apparatus, or, second, moisture collecting on the insulator, which insulates the electrode from which the output is withdrawn from the detector so as to ground the output to the detector body and destroy the output signal, or, third, efficiently mixing the gaseous sample to be tested, the combustion air, and the gaseous hydrogen that is to be burned with the air.

The instant invention eliminates these problems in two ways. First, the problem of efficient mixing is eliminated by introducing the hydrogen in a first conduit and the sample to be tested and air in a second but larger conduit concentrically oriented to the first conduit. Stated another way, an annular conduit is employed and the hydrogen is introduced through the center portion and the sample and air are introduced through the annular passage. Secondly, the problems of extraneous matter collecting in the detector and moisture grounding the output of the detector are solved by a vacuum ejection system. The vacuum ejection system removes matter produced by the combustion process from the detector due to the movement of air from the combustion chamber resulting from the vacuum effect. The vacuum ejection system prevents the insulator from being grounded to the detector body because the movement of air into the combustion chamber resulting from the vacuum effect is caused to flow through a passageway and around the insulator encasing the electrode from which the detector output is withdrawn. This movement of air around the insulator removes by evaporation the moisture collecting on the insulator as a result of the combustion process. As has been noted, if the moisture is allowed to collect on the insulator, the impedance of the circuit is increased to a point where the output flowing through the electrode encased by the insulator is depressed to an unmeterably low level because the output leaks to ground through the detector body. Stated another way, when output is grounded to the extent that the signal is depressed to an unmeterably low level, the device is inoperative.

In one embodiment, this invention comprises utilizing the above described detector to detect the presence of combustible odorous gases in blow molded or thermoformed polymerized hydrocarbon containers. Specifically containers constructed of polyvinyl chloride, polyethylene, or polypropylene are well suited for the practice of this invention. In this embodiment, the detector is positioned adjacent to a conveyor belt on which the containers to be tested are being moved. The probe that withdraws the sample to be tested is in the form of a swinging arm. According to this invention, the conveyor belt moves a container forward until a light beam is broken, at which time the belt stops. The probe then swings out and positions the end of the probe so as to withdraw a sample from the container. The sample is then withdrawn from the container and tested in the detector and the presence of a combustible gas recorded in a recorder attached to the detector. The probe then swings back and the belt moves forward until the next container on the belt breaks a light beam and the cycle is repeated.

Accordingly, an object of this invention is to provide a method and apparatus for the detection of combustible gases.

Another object of this invention is to provide a method and apparatus for the detection of odors from combustible gases in containers for humanly consumed products.

Another object of this invention is to provide apparatus whereby the operation of a combustible gas detector can be greatly improved.

Other objects, advantages, and features of this invention will be readily apparent to those skilled in the art from the following description, drawing, and appended claims.

Figure 2:
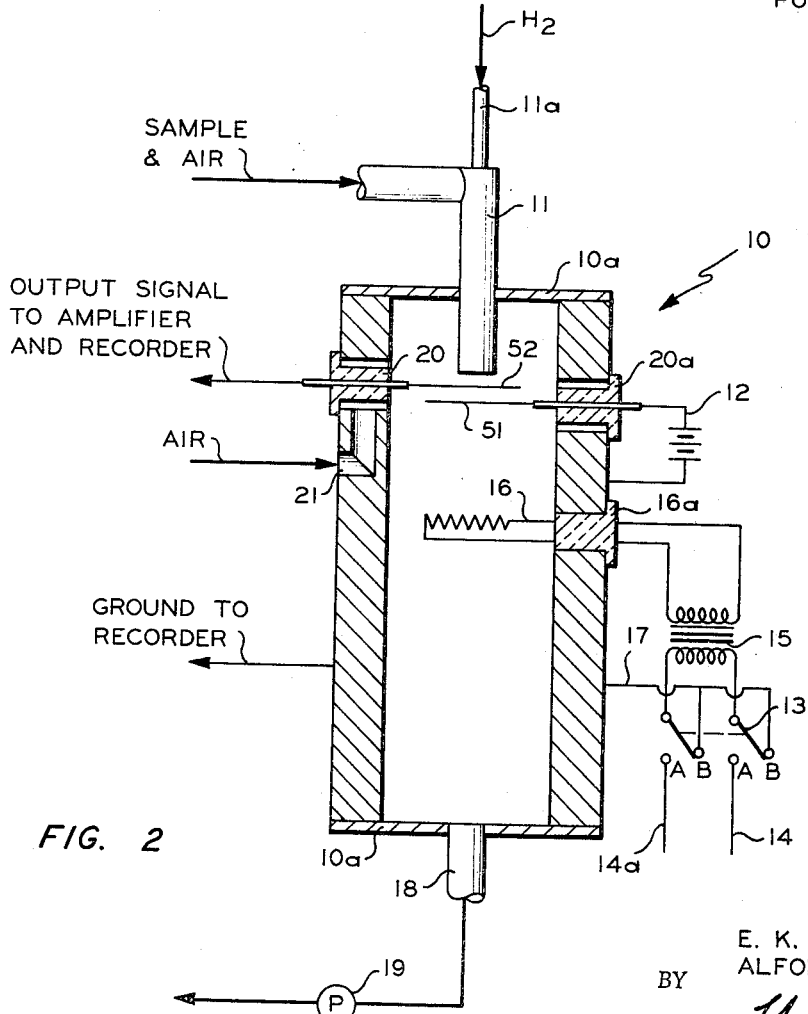
Figure 3:
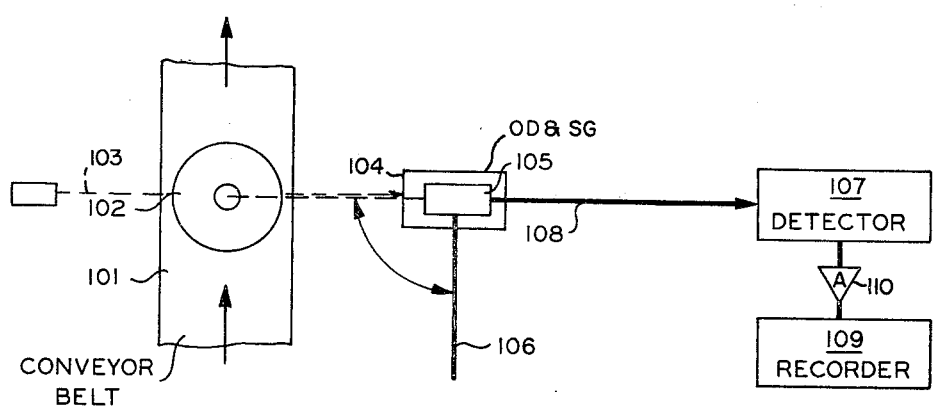
Figure 4:
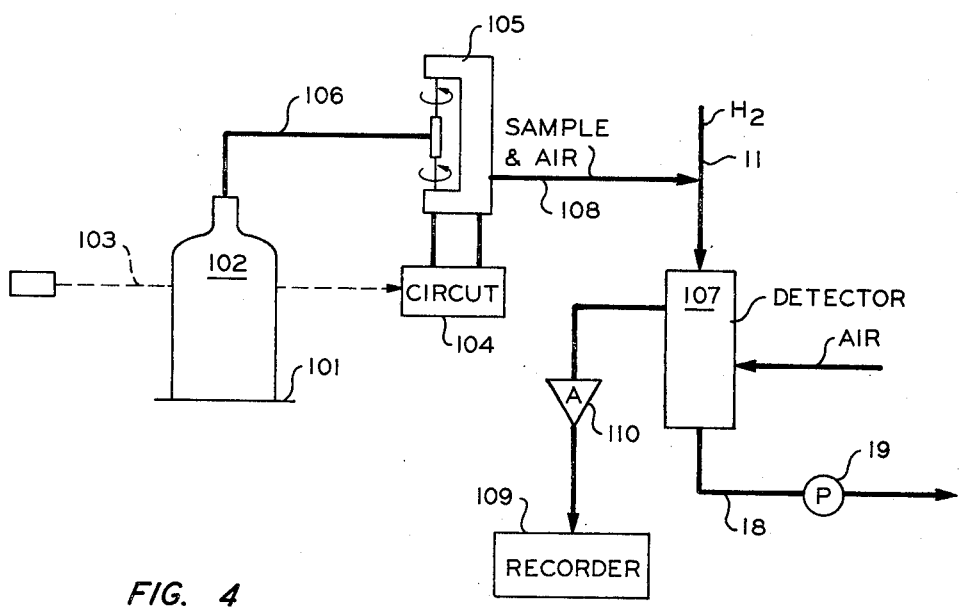

FIGURE 1 is a schematic representation of the detector being used to detect the presence of combustible gases in a container. FIGURE 2 is an elevation view in cross-section of the detection apparatus indicating the novel and significant changes over prior art. FIGURE 3 and FIGURE 4 are a detailed plan and elevation view of the inventive apparatus being used for the method of detecting odorous combustible gases in containers moving on a conveyor belt.

Referring to FIGURE 2 there is indicated one embodiment of the invention. In this embodiment, two ends of a cylindrical housing 10 are closed by end plates 10a. The leads for electrodes 51 and 52 are encased, respectively, by insulators 20a and 20 and spaced apart from one another in the upper portion of the housing. Additionally, there is inserted through the top plate of the housing an inlet comprising a first conduit 11 and a second conduit 11a. Conduit 11 is larger than conduit 11a and conduit 11a is oriented concentrically to conduit 11. Conduits 11 and 11a terminate slightly above electrodes 51 and 52. Conduit 11a connects with a source to supply hydrogen gas to the space between electrodes and conduit 11 is connected to a probe which withdraws the sample along with air from the container being tested and discharges the air and sample to be tested between the electrodes. It is to be noted that an extremely efficient and novel method of mixing the hydrogen with the sample and air is accomplished by the described inlet.

With further reference to FIGURE 2, there is indicated a passageway 21 within said housing 10. Said passageway 21 is oriented so as to conduct air passing therethrough around insulator 20. As a result, air flowing through conduit 21 is permitted to pass around insulator 20 and evaporate moisture that has collected thereon due to the combustion process. The removal of water from insulator 20 is necessary due to the fact that a collection of moisture on the surface of insulator 20 will ground the detector output flowing through electrode 52 to the housing 10.

With additional reference to FIGURE 2, there is indicated a DC electrical power source 12. This power source can comprise any DC power source capable of generating a sufficiently powerful output to be meterable. In one embodiment, a 15 volt dry cell is satisfactory.

Additionally, there is indicated in FIGURE 2 an igniter 16 provided with a suitable insulator 16a. The leads from igniter 16 are placed across one coil of a transformer 15. The leads from the other transformer coil are conducted to switch 13. Switch 13, as will be noted, can be moved to the A position, whereupon an alternating current line signal flowing through leads 14 and 14a is conducted through transformer 15 and actuates igniter 16. When switch 13 is moved to the B position the igniter 16 is de-energized by ground wire 17.

There are indicated conduit 18 and vacuum pump 19 in FIGURE 2. Conduit 18 is connected to the bottom end plate of the housing and conducts air through conduit 18 resulting from the operation of vacuum pump 19.

The detector output is withdrawn from electrode 52 and conducted to amplifier 110 and recorder 109 (not shown in FIGURE 2).

The operation of the detector only will now be described. The operation of the detector withdrawing a sample to be tested will be described later. As to the operation of the detector only, hydrogen is introduced into the housing through conduit 11a which is the smaller of the two concentrically oriented conduits. A sample to be tested for the presence of combustible matter and air are introduced through conduit 11 which is the larger of the two concentrically oriented conduits. The hydrogen air, and sample to be tested flow downward past electrodes 51 and 52 and in the area around igniter 16. Switch 13 is then moved to the A position, thus energizing igniter 16 by placing an alternating current line signal through transformer 15 and into igniter 16. Igniter 16 then ignites the hydrogen, air, and gaseous sample, thus initiating the combustion. After initiation of the combustion process, switch 13 is rotated to the B position and the combustion continues.

The detector functions by measuring the conductance between electrodes 51 and 52. The conductance between electrodes 51 and 52 provides a quantitative measure of the existence of combustible matter in the sample that is being tested. The conductance phenomenon appears to be the result of step-wise decomposition of the combustible materials to highly unsaturated intermediates which are subsequently broken down to carbon which is ionized. These ionized particles are collected by the aforementioned electrodes in the electrical fields within the flame and form, along with electrons from the decomposition process, an ionic current, which is electrically amplified and recorded.

As has been previously mentioned, housing 10 is equipped with a vacuum ejection system. As a result, a downwardly decreasing pressure gradient is effected by a vacuum pump 19 in that portion of the housing below passageway 21 and in vacuum conduit 18. The vacuum feature pulls out debris that collects in the combustion chamber as a result of the combustion process and also pulls air in through passageway 21. The value of air entering through passageway 21 will now be explained in detail.

As an unavoidable consequence of the combustion process, water is formed in the combustion chamber. Water collecting on the surface of output electrode insulator 20 generates an impedance in the order of 1,000 megohms (or less) by grounding the output to the housing 10. This impedance is sufficiently small to reduce the amplifier input signal voltage to a virtually immeasurable level. This impedance decrease problem is eliminated by a passageway comprising air intake passageway 21. Air is drawn through said air intake passageway 21, as a consequence of the operation of the vacuum pump 19. The air then passes through passageway 21 around output signal insulator 20, wherein said output signal insulator 20 is thereby dried of water; hence, the output is not ground.

With reference to FIGURES 3 and 4, there is indicated a conveyor belt 101 moving a polymerized hydrocarbon container 102 in such a manner so as to break a light beam 103. The light source generating light beam 103 can comprise any course capable of being focused on and actuating optical detector and signal generator 104. Particularly suited for this service would be a long-life lamp, light tube, or light emitting diode, such as GE–LED–9. The optical detector and signal generator 104 can comprise any means capable of detecting the difference between the existence and absence of a light beam incident thereon and generating an electric signal therefrom. Particularly, the circuit identified as the "Production Line Flow Monitor" in General Electric Data Booklet, 200.34 1/65 is satisfactory.

Additionally, there is indicated in FIGURE 3 rotating means 105 designed to rotate a means 106 capable of withdrawing a gaseous sample from polymerized hydrocarbon container 102. Rotating means 105 can comprise any means capable of rotating means 106 so as to withdraw a gaseous sample from container 102. Specifically, an armature responding to an induced magnetism and thereby causing rotation is satisfactory. Means 106 can comprise any means capable of withdrawing a gaseous sample from container 102. Particularly, a small tube is applicable. The diameter of the tube can vary to meet the particular needs of the user regarding purity and volume of sample to be withdrawn.

Additionally, in FIGURE 3 there is indicated a means capable of detecting the presence of a combustible gas. In one embodiment, this constituted hydrogen flame detector 107. The gaseous sample and air withdrawn by means 106 is conducted through conduit 108 to the hydrogen flame detector whereupon it is introduced into the hydrogen flame detector through reference 11 in FIGURE 1.

In the operation of this particular embodiment of our invention, the conveyor belt 101 moves the container 102 in such a manner so as to interrupt light beam 103. Upon interruption of light beam 103, the conveyor belt 101 halts for a predetermined time suitable for sample withdrawal according to a prearranged timing schedule. Upon interruption of light beam 103, optical detector and signal generator 104 observes that the light beam has been broken and generates a responsive signal; said signal is then impressed into rotation means 105 wherein rotation means 105 causes testing means 106 to rotate 90° to place testing means 106 over the container to be tested, as shown in FIGURE 4 whereupon a gaseous sample is withdrawn via testing means 106. After a predetermined duration of time, rotation means 105 returns testing means 106 to its original position. The sample withdrawn from container 102 via testing means 106 is introduced into the hydrogen flame detector previously disclosed, whereupon the gaseous sample is tested to determine the presence of certain combustible gaseous materials. According to the prearranged timing schedule, previously mentioned, the conveyor belt 101 is actuated and the next container to be tested moves forward until light beam 103 is again interrupted and the aforementioned cycle is repeated. In one embodiment, the response from the hydrogen flame detector was amplified in amplifier 110 and recorded in recorder 109.

The usefulness of the inventive method and apparatus is not to be considered limited to detecting odors in polymerized hydrocarbon containers but, however, could be employed to detect odors in any container.

This invention is broadly applicable to the detection of gases.

Various modifications of this invention can be made in view of the foregoing disclosure and the appended claims without departing from the spirit or scope thereof.

We claim:
1. A method of testing a polymerized hydrocarbon bottle to detect gaseous combustible materials comprising the steps of:
   (a) withdrawing a gaseous sample from a polymerized hydrocarbon container via a hydrogen flame detector probe;
   (b) conducting the sample from the probe directly to a hydrogen flame detector;
   (c) testing the withdrawn gaseous sample in the hydrogen flame detector to determine the presence of combustible materials.
2. The method of claim 1 further comprising the steps of:
   (a) positioning a first container to be tested so as to break a light beam;
   (b) rotating the hydrogen flame detector probe from an initial position to a gaseous withdrawal position responsive to the breaking of the light beam;
   (c) withdrawing a gaseous sample from a polymerized hydrocarbon container via a hydrogen flame detector probe;
   (d) conducting the sample from the probe directly to a hydrogen flame detector;
   (e) testing the withdrawn gaseous sample in the hydrogen flame detector to determine the presence of combustible materials;
   (f) recording the response from the testing step.

References Cited

UNITED STATES PATENTS

| | | | |
|---|---|---|---|
| 3,139,915 | 7/1964 | Minard | 250—223 XR |
| 3,169,389 | 2/1965 | Green et al. | |
| 3,193,358 | 7/1965 | Baruch | 23—230 XR |
| 3,203,248 | 8/1965 | Stutler et al. | |

MORRIS O. WALK, Primary Examiner

R. M. REESE, Assistant Examiner

U.S. Cl. X.R.

23—254; 73—19, 421; 250—218